United States Patent [19]

Henriksen

[11] Patent Number: 4,530,820
[45] Date of Patent: Jul. 23, 1985

[54] DEAERATION OF WATER

[75] Inventor: Norolf Henriksen, Notodden, Norway

[73] Assignee: Norsk Hydro a.s., Oslo, Norway

[21] Appl. No.: 526,879

[22] Filed: Aug. 26, 1983

[30] Foreign Application Priority Data

Sep. 13, 1982 [NO] Norway .............................. 823090

[51] Int. Cl.³ .............................................. B01D 19/00
[52] U.S. Cl. .................................... 423/219; 423/235;
423/580; 55/51; 203/49
[58] Field of Search ........................ 423/219, 235, 580;
55/51; 406/197; 417/108, 118, 54, 55, 65;
203/49

[56] References Cited

U.S. PATENT DOCUMENTS 2,582,885  1/1952  Rosenblatt ......................... 423/219
3,535,074 10/1970  Nakashima ......................... 423/580
4,017,276  4/1977  Bloem .................................. 55/51

FOREIGN PATENT DOCUMENTS 531386 10/1956 Canada ................................. 423/219

OTHER PUBLICATIONS

Dunbar, R. E.; *General Chemistry*, Little Field, Adams & Co., pp. 22-23, (1964).

Primary Examiner—L. Dewayne Rutledge
Assistant Examiner—Christopher W. Brody
Attorney, Agent, or Firm—Wenderoth, Lind & Ponack

[57] ABSTRACT

Seawater which is to be used as injection water in underground oil reservoirs to obtain a higher degree of hydrocarbon recovery deoxygenated by a new and improved process that eliminates the consumption of stripping gas and at the same time attains the highest possible degree of oxygen removal without polluting the water. Seawater is circulated through an inert gas, thus removing oxygen. Degassed water is separated from the inert gas, and the latter is routed through a zone for purification and regeneration. Hydrogen is introduced into the gas containing oxygen, and this gas mixture subsequently flows through a catalytic reactor where hydrogen and oxygen are reacted to form water, whereafter the purified gas is recirculated.

7 Claims, 2 Drawing Figures

DEAERATION OF WATER

BACKGROUND OF THE INVENTION

This invention concerns the removal of gases from water, in particular the dearation of seawater which will be injected into deep structures in order to increase the extractable fraction of subsurface hydrocarbon resources.

In this connection it is important to remove the oxygen from the seawater in order to reduce corrosion rates and prevent growth of aerobic bacteria which will impede the flow of hydrocarbons from the structure.

This problem has been known for a long time and different solutions have been proposed. The great majority are based on one of two principles, degassing by reduced pressure, degassing by gas-stripping or a combination of these two. Large quantities of seawater are injected, and the degassing has to be satisfactory at all times. Untreated seawater is usually saturated with oxygen and it may cause severe corrosion if the deoxygenation treatment is not working satisfactorily.

It is therefore necessary to put great demands on the quality of the deoxygenation process, and thus large and expensive plants are required.

Vacuum degassing is often considered unsuitable because of the very complicated and heavy equipment. Stripping with natural gas has therefore often been preferred in practice. Natural gas is easily accessible in great quantities offshore and has so far been used as a stripping agent for deoxygenation. After the stripping process, however, the gas is not suitable for sale and has to be flashed.

Pollutants in the natural gas, including $CO_2$ and $H_2S$, reduce the quality of the water and this is also a disadvantage. Furthermore, stripping towers using natural gas have a high gas consumption, and the weight and volume are almost the same as for vacuum towers.

A stripping plant employing recirculated nitrogen gas is described in U.S. Pat. No. 4,017,276 (Norwegian patent Application No. 77 2185). According to this patent, deoxygenation is performed in a stripping tower using nitrogen gas. The oxygen gas is removed from the nitrogen using low temperature fractionation. The gas consumption hence will be low.

The fractionation device however, is bulky and expensive, and the cooling device consumes large amounts of energy. Expensive precautions are required in order to obtain sufficiently low oxygen levels. Nitrogen stripping gas from gas fractionating generally contains 10 ppm to about 100 ppm oxygen and must be further purified before recycling.

Seawater used for injection is usually lifted from below sea level by submersible centrifugal pumps. It has been proposed to use a gas-lift instead. This is a simple system. It normally has a higher reliability than mechanical pumps, and it is capable of pumping the water to elevations high above the surface.

The gas-lift pipes will under certain conditions have a stripping effect, causing removal of oxygen from the water. Natural gas has been used in gas-lift systems. A great drawback, however, is the demand for great amounts of natural gas. The consumption is at least three times higher than for stripping towers. Furthermore, $H_2S$ and $CO_2$ will be transferred to the water and acidify it.

SUMMARY OF THE INVENTION

Thus, it is the main objective of this invention to obtain a new and improved process to remove oxygen by gas treatment, achieving highly efficient and more reliable oxygen removal without consumption of stripping gas.

A further object of this invention is to obtain a new and improved procedure for water supply and at the same time to achieve an optimum oxygen removal.

Another object is to minimize the space requirements and the weight of the equipment. Finally, it is an object of the invention to avoid the acidification of the treated water.

A main feature of this invention is that water is degassed in a gas/water stripping system using a recirculating inert gas, which is regenerated and purified in the gaseous state. Hydrogen is introduced to react with the oxygen in the gas, and the reaction takes place in a catalyst in the recirculating system.

Hydrogen is introduced to react with the oxygen in the gas from the gas-lift. The reaction takes place on a catalyst in the recirculating system.

DESCRIPTION OF THE DRAWINGS

Other features characterizing the invention are described in the following and also are shown in the accompanying drawings, wherein.

DETAILED DESCRIPTION OF THE INVENTION

Figure 1:
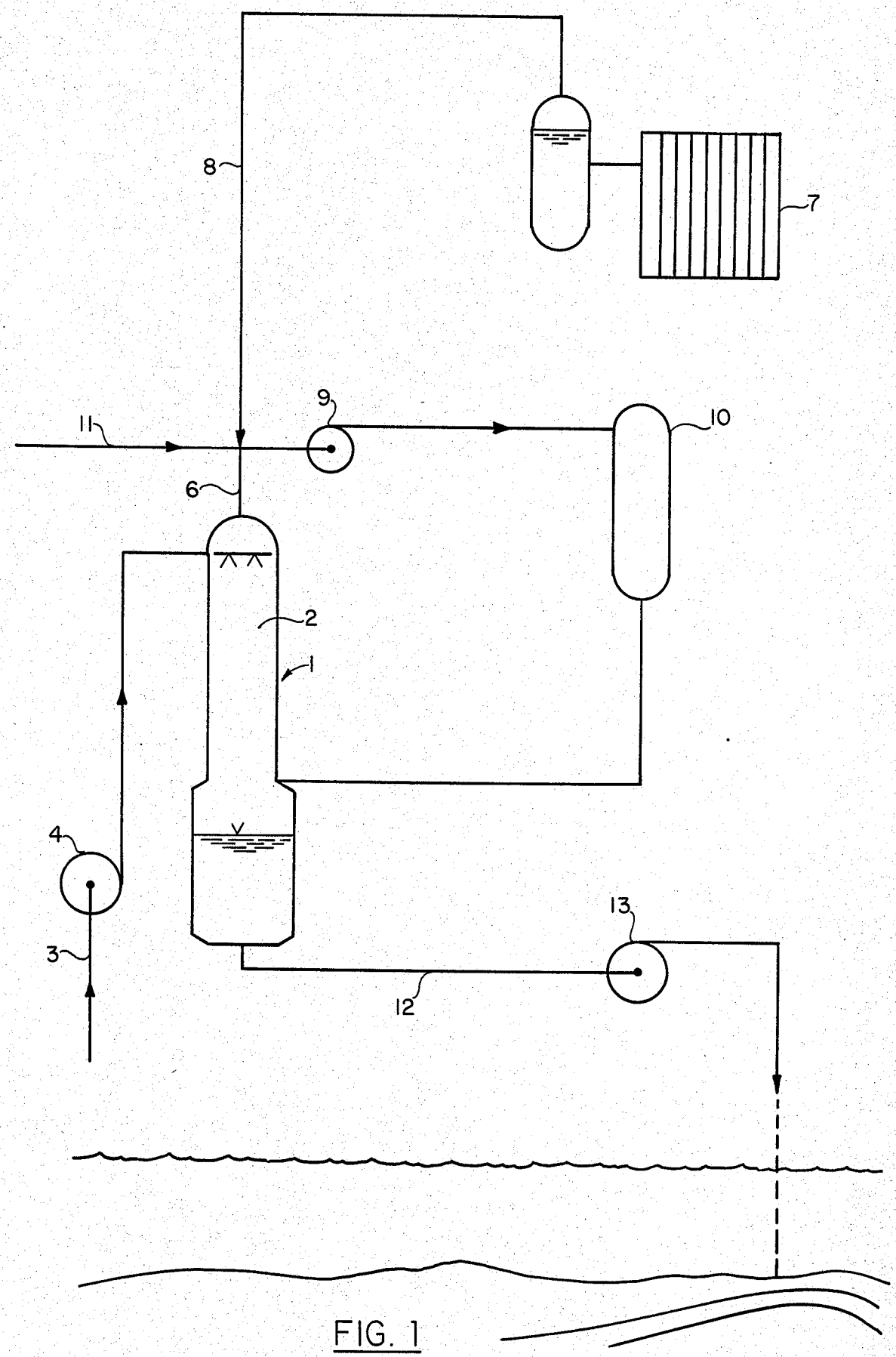
FIG. 1 is a schematic view of a system utilizing a stripping tower according to the invention.

FIG. 1 shows a stripping column or tower 1 equipped with perforated plates 2, raschigrings or the like. Seawater containing oxygen is conducted through a pipe 3 via a lower pressure pump 4 to the top of the stripping tower.

Thus, the water passes downwards countercurrent to upwards streaming stripping gas, which is introduced at a lower portion of the tower through a pipe 5. In the stripping tower the oxygen is removed by the stripping gas as is well known, so that the sea water is substantially free of oxygen when leaving the stripping zone. Oxygen rich stripping gas leaving the top of the tower is then led through a pipeline 6 and mixed with a stream of pure hydrogen from a pipe 8.

The pure hydrogen gas (99.9%) is added in measured stoichiometric amounts or in excess of the oxygen content in the stripping gas from a water electrolyzer 7 or from another suitable hydrogen generator through the pipe 8. Care is taken to obtain adequate mixing of the gases. The gas mixture is then, by means of a suitable pumping means in the form of a compressor 9 or the like, led into a catalyzing chamber 10 filled with dry granulated catalyst consisting of active palladium or platinum precipitated on an alumina base. Therein the hydrogen and oxygen catalytically react to form water. This reaction is exothermic and thus will raise the temperature of the gas. The reaction takes place at atmospheric pressure, and the hydrogen and oxygen combine completely, thus generating heat which will evaporate the generated water and heat the stripping gas. The warm stream will go with the oxygen free stripping gas back to the tower.

The remaining stripping gas will now be substantially free of oxygen and may immediately be recirculated through the pipe 5, which is connected to the lowermost part of the stripping tower.

Due to the fact that some gas is consumed in the system by being absorbed in the outgoing sea water, minor amounts of fresh stripping gas are added through pipe 11, so that there continuously will be established on optimum ratio between stripping gas and sea water. This stripping gas will also be led through the catalytic chamber 10 before it is conducted to the stripping tower.

This ensures that all the gas used is efficiently purified and free of oxygen, so that the stripping tower continuously is supplied with stripping gas which contains less than 1 ppm oxygen. The gas mixture which is led to the chamber 10 preferably should be at a temperature between 10°–40° C.

A purer stripping gas will have greater power to absorb oxygen from the water to be deoxydized. Due to the fact that the purification step results in an end pollution product which is water, it will not be necessary to remove such product in a separate product stream (bleed), because this can be led into the main stream of the system, which is in fact water. Further, this also results in that energy generated by the catalytic reaction will be absorbed by the system and utilized.

The resulting purified sea water will, as mentioned above, be collected at the bottom of the tower 1 and will be injected into a hydrocarbon containing structure through a pipeline 12 by means of high pressure compressors 13, thereby to enhance the production of hydrocarbons from deeply situated production wells.

EXAMPLE

Sea water containing 10 ppm $O_2$, corresponding to an $O_2$ content of 70 l/h, is added to the top of a vertical stripping tower in amounts of 10 m$^3$/h and at a temperature of 20° C. 140 l/h $H_2$ is added through pipe 8 and mixed with 50 m$^3$/h $N_2$ stripping gas which circulates in the system.

Through the pipe 11 is added 70 l/h nitrogen as fresh stripping gas to replace the gas consumed. The resulting gas mixture containing 50 m$^3$/h $N_2$ and 140 l/h $H_2$ and 70 l/h $O_2$, is preheated to 25° C. and is led to the catalyst chamber for catalytic reaction of the $H_2+O_2$ components. The catalytic reaction and formation of steam will increase the temperature in the system without the introduction of external energy.

The purified nitrogen containing <1 ppm $O_2$, is led to the bottom of the stripping tower at a temperature of 45° C. Deoxidized sea water from the bottom of the tower contains <1 ppm $O_2$, and is without further treatment ready to be injected into the hydrocarbonrich structure.

Figure 2:
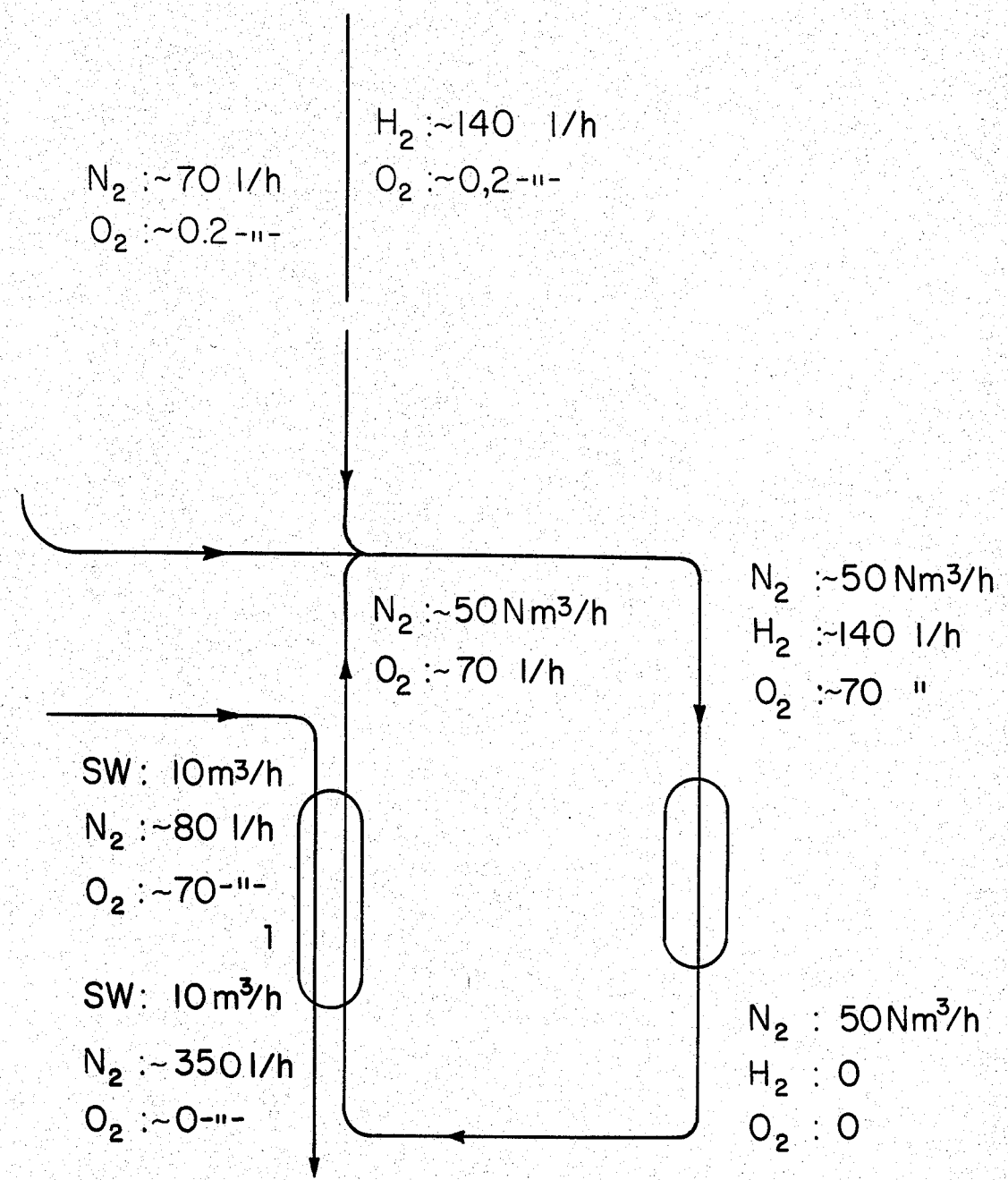
FIG. 2 is a simple flowsheet with amounts (volume parts) for the individual streams.

In the simple flow sheet of FIG. 2 are illustrated the amounts of the individual gas and liquid streams of the system. The abbreviation SW denotes sea water, while the reference numerals 1 and 10 refer to the stripping tower and the deoxidizer, respectively.

The process according to the invention is especially advantageously due to the complete reaction of oxygen which is achieved in the regeneration step. The inert gas will contain <1 ppm oxygen, while normally 10–100 ppm. This improves the efficiency of the stripping operation, thus resulting in nearly oxygen free sea water after the treatment.

The above method is only to be considered as a preferred embodiment of the invention. It is therefore possible within the spirit and scope of this invention to make use of a catalytic reaction other than the Pd-based reaction discussed above. Inert gases other than nitrogen and other methods for purifying the inert gas may also be taken into consideration.

Furthermore, the form of the stripping tower as well as the interior of the same will vary, and it is possible to use two or more stripping columns joined together. With the minor amounts of supplemental nitrogen which is required, it will normally be sufficient to use liquid nitrogen stored in vacuum isolated containers. Air fractionating plants or $N_2$-generators may also be used if the need for fresh nitrogen gas is high, i.e. when great volumes of sea water have to be deoxidized. But also in these circumstances it is necessary to circulate the gas through the catalytic zone before it is added to the bottom of the stripping tower.

Furthermore, other stripping gases than nitrogen, as used according to the examples, may also be employed. Natural gas e.g. is normally available and may be used for stripping. It is recirculated after leaving the catalytic regeneration and possibly a purification step, and this eliminates the need for flashing the gas off. Other inert gases may also be employed, e.g. argon.

I claim:

1. In a process for deoxidizing water by intimately mixing an inert gas with said water, whereby said inert gas removes oxygen from said water, and separating the thus deoxidized water and said inert gas thus enriched with oxygen, the improvement comprising:

mixing hydrogen gas with said oxygen enriched inert gas;

passing the resultant gas mixture into a catalytic reaction zone and therein catalytically reacting said hydrogen and oxygen at atmospheric pressure to form water;

removing the thus purified inert gas and said water from said catalytic reaction zone and directly mixing said purified inert gas and said water with additional water to be deoxidized; and conducting the entire said process without additional drying, cooling, purification or rectification of the inert gas.

2. The improvement claimed in claim 1, wherein said inert gas comprises purified nitrogen gas, and said mixing and removing comprises stripping oxygen from said water to be deoxidized by means of said nitrogen in a stripping column.

3. The improvement claimed in claim 1, wherein said hydrogen is added in stoichiometric amounts and reacts stoichiometrically with said oxygen at atmospheric pressure in the presence of a catalyst.

4. The improvement claimed in claim 3, comprising introducing said gas mixture into said reaction zone at a temperature of 10°–40° C. under conditions for catalytic reaction.

5. The improvement claimed in claim 1, wherein the catalytic reaction is exothermic, thereby heating said purified inert gas.

6. The improvement claimed in claim 1, further comprising adding make-up inert gas to said oxygen enriched inert gas prior to said catalytic reaction.

7. The improvement claimed in claim 1, wherein said purified inert gas from said reaction zone has an oxygen content of <0.1 ppm.

* * * * *